United States Patent [19]

Boksjo, deceased

[11] 3,842,335

[45] Oct. 15, 1974

[54] STATIC CURRENT CONVERTER WITH BYPASS MEMBERS

[75] Inventor: Carl Ingvar Boksjo, deceased, late of Gothenburg, Sweden by Stina Boksjo, petitioner

[73] Assignee: Allmanna Svenska Elektriska Aktiebolaget, Vasteras, Sweden

[22] Filed: May 15, 1973

[21] Appl. No.: 360,539

[30] Foreign Application Priority Data

May 18, 1972 Sweden.............................. 6517/72

[52] U.S. Cl..................... 321/13, 307/85, 321/27 R
[51] Int. Cl. .......................................... H02m 1/00
[58] Field of Search ...................... 321/27 R, 11–13; 307/85

[56] References Cited
UNITED STATES PATENTS

| 2,532,107 | 11/1950 | Lamm.................................. 321/11 |
| 2,532,108 | 11/1950 | Lamm.................................. 321/11 |
| 2,534,036 | 12/1950 | Lamm.................................. 321/11 |
| 2,684,460 | 7/1954 | Busemann............................. 321/11 |
| 2,684,461 | 7/1954 | Busemann............................. 321/11 |
| 2,899,628 | 8/1959 | Uhlmann............................ 321/27 R |
| 3,622,861 | 11/1971 | Boksjo ........................... 321/27 R X |
| 3,622,862 | 11/1971 | Boksjo ................................. 307/85 |
| 3,628,124 | 12/1971 | Johansson..................... 321/27 R X |
| 3,641,356 | 2/1972 | Ekstrom........................ 321/27 R X |

Primary Examiner—William H. Beha, Jr.

[57] ABSTRACT

A current converter includes a three-phase rectifier bridge and a member arranged in parallel with the bridge to bypass its DC side. Two series-connected rectifiers of one phase in the bridge are arranged to act as by-pass rectifiers for the converter. A control circuit includes an arrangement for facilitating ignition of the two by-pass rectifiers when the by-pass connection is opened in connection with the reconnection of the converter. At least one other rectifier in the bridge is connected to a special firing device having such a delay angle that the internal direct voltage of the rectifier bridge will be positive when considered in the conducting direction of the rectifiers.

7 Claims, 4 Drawing Figures

STATIC CURRENT CONVERTER WITH BYPASS MEMBERS

BACKGROUND OF THE INVENTION

1. Field of the Invention

The present invention relates to a static converter comprising a three phase rectifier bridge and a member arranged in parallel therewith to bypass the DC side of the rectifier bridge. Furthermore, two series-connected rectifiers belonging to one phase in the bridge are arranged to act as by-pass rectifiers for the static converter and for this purpose are provided with a special control circuit.

2. The Prior Art

In a static converter station for high voltage comprising several converters connected in series, in order to be able to disconnect one of these it is usual for each converter to be provided with a bypass member. In static converters having mercury arc rectifiers where a certain number of backfirings may be expected, these bypass members usually comprise a bypass rectifier of the same type and size as the working rectifiers of the static converter, and a short-circuiting member which is generally in the form of an isolator. With the advent of thyristor-rectifiers for high voltage static converters, backfiring and arc-through may be disregarded because of the nature of these rectifiers. Consequently, no bypass rectifier is necessary to unload the rectifier bridge in the event of a rectifier fault and the bypass member is therefore limited to a short-circuiting device, and two series-connected rectifiers in one phase of the rectifier bridge can be utilized as bypass rectifiers when the bridge is being connected.

As mentioned, for the short-circuiting device it is usual to use an isolator which opens when the converter is connected. An arc is then drawn out in the isolator and the voltage drop in this isolator is used to fire the bypass rectifier(s). However, in comparison with the normal operating voltages of the rectifiers, which may be 100 kV or more, this arc voltage drop is rather slight, about a kilovolt or so, which is often insufficient to charge the firing circuits of the thyristors. It is therefore possible that the bypass rectifiers will not fire at the first attempt and the isolator must be closed again and a fresh attempt must then be made.

The type of isolator which will stand the considerable power generation of repeated opening attempts is one which operates relatively slowly. If quicker connection of the converters is desired using quicker connecting members, then the certainty of ignition of the bypass rectifiers must be facilitated by increasing the voltage over the rectifiers so that the required charging is obtained in the firing circuits.

SUMMARY OF THE INVENTION

According to the invention, this is achieved by giving a firing impulse to another rectifier in the bridge as well as the two series-connected rectifiers which form the bypass path. A static converter according to the invention is characterised by the fact that members are arranged in parallel with the bridge to bypass its DC side. Two series-connected rectifiers belonging to one phase in the bridge are arranged to act as by-pass rectifiers for the convertor. For this purpose, a special control circuit is provided which facilitates ignition of the by-pass rectifiers when the by-pass member is opened in connection with a reconnection of the converter. One or more controlled rectifiers in the bridge are provided with a special firing device for ignition, this device having such a delay angle that the internal direct voltage of the rectifier bridge will be positive when considered in the conducting direction of the rectifiers.

In this way the voltage from the converter-transformer is utilized to ignite certain rectifiers before, or just after, the short-circuit element has been opened and the short-circuiting current which is obtained from the rectifier bridge through the short-circuit element has opposite direction to the main current in the short-circuit element so that the resultant current in the short-circuit element will show a zero-passage during each period of the voltage on the AC side of the static converter and it is therefore possible to use a high-speed breaker of the AC breaker type as the short-circuit element.

BRIEF DESCRIPTION OF THE DRAWINGS

The invention will be further described with reference to the accompanying drawings in which FIG. 1 shows a converter station having a number of converters connected in series, while

DESCRIPTION OF THE PREFERRED EMBODIMENTS

Figure 1:
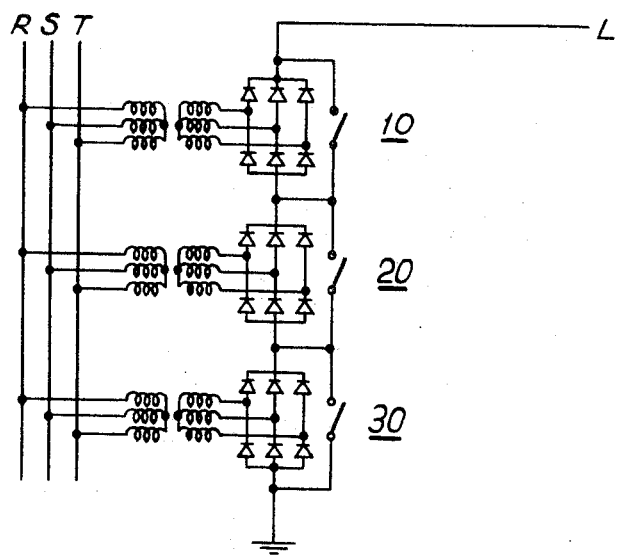

FIG. 1 shows a static converter station comprising three static converters 10, 20, 30 for connecting an AC network RST to a DC line L. Each converter comprises a rectifier bridge and a converter-transformer and the converters are series-connected on the DC side and parallel-connected on the AC side. Each converter is also parallel-connected on the DC side with a bypass member in the form of an isolator or breaker or the like.

Figure 2:
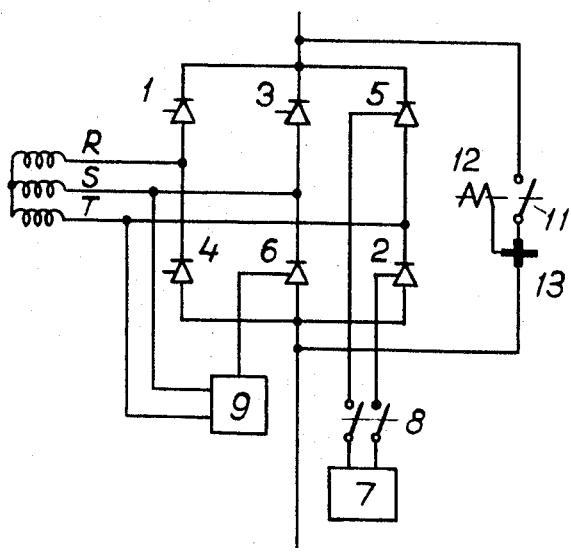
FIG. 2 shows one of these static converters in more detail in accordance with the invention.

FIG. 2 shows a more detailed embodiment of a converter showing only the rectifier winding of the converter-transformer. The rectifier bridge comprises six rectifiers 1 – 6, indicated by the symbol for a single controlled semiconductor-rectifier whereas in practice each rectifier comprises a large number of semiconductor-rectifiers connected in series and in parallel, preferably thyristors. During normal operation the rectifiers are controlled by an angle control device, not shown.

The rectifiers 2 and 5 belonging to phase T have been selected as bypass rectifiers and, for this purpose, are provided with a special control member 7 which is in principle simply a positive control voltage source which is connected over a connecting member 8 to the control electrodes of the rectifiers.

The rectifier bridge is parallel-connected with a bypass connection member 11 which, in previously known constructions, was in the form of an arc-drawing isolator which operated relatively slowly. The invention, however, permits the use of a high-speed breaker. This is closed in a manner not further described, either from a fault indicator, known per se, in the converter, or possibly by manual intervention, for example during a routine service inspection. When the member 11 closes, it takes over the direct current from the converter and can, for example, be kept in closed position by the coil 12 which is actuated by the main current in 11 through the transductor 13.

When the converter is to be reconnected, the connection member 8 is closed, whereupon the rectifiers 2 and 5 receiving firing voltage. In order for these rectifiers to ignite and take over the current from 11, however, they must have a positive voltage over anode-cathode and, as mentioned, this has previously been achieved by opening the member 11 so that an arc voltage drop arose over this member. As has also been mentioned, however, this arc voltage drop may very well be insufficient to fire the often hundred or more thyristors which are series-connected in the rectifiers 2 and 5, particularly as the control and firing circuits for these rectifiers must be charged first.

Figure 3:
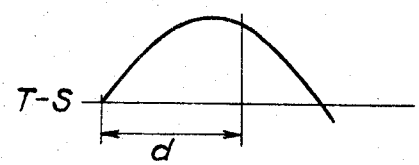
FIG. 3 shows the voltage over two phases in the rectifier bridge.

According to the invention, therefore, one of the other rectifiers, for example 6, is provided with a special control device 9 connected to phases S and T. The voltage T-S is shown in FIG. 3 and the rectifier 6 receives a control pulse after a certain delay angle $d$ in relation to the zero-passage of the voltage T-S. The control device 9 can therefore be designed as a voltage level indicator which senses the zero-passage of the voltage in the positive direction and may be provided with a delay circuit on the output side, with the help of which the delay angle d is set.

When the rectifier 6 receives a control pulse, after the rectifiers 2 and 5 have received control impulses, a current will develop from phase T in the transformer-winding, through rectifier 5, member 11, transductor 13, rectifier 6 and phase S. This current has an opposite direction to the main current in the member 11 and, when these two currents become equal or approximately equal, then 11 as well as 12 will become currentless and the member 11 can be opened. Since the member 11 is thus almost currentless, this member can be designed as a high-speed breaker instead of the slowly-operating isolator previously used.

The current growing up quickly from the converter-transformer acquires the character of a short-circuiting current. As can be seen from FIG. 3, the voltage T-S will soon decrease towards zero and change sign, whereupon the current commutates from rectifier 6 to rectifier 2 so that the two bypass rectifiers 2 and 5 become conducting and take over the main current from 11.

It is clear from the above that the control angle $d$ for the rectifier 6 should be adjusted so that the current in the member 11 becomes zero and the member 11 opens at approximately the same time that the current commutates from rectifier 6 to rectifier 2. Also, as a result of this, the angle d should be dependent on the magnitude of the main current so that the delay in control device 9 is preferably made dependent on the main current.

If the first attempt to re-connection should be unsuccessful, the member 8 is merely allowed to remain closed, whereupon a new attempt will automatically be made next time the voltage T-S becomes positive, that is, a re-connection attempt is automatically obtained during each period of the alternating voltage RST. Often it may be suitable to arrange a supervising member in communication with 12, 13 which, if 11 does not become completely currentless after a few periods, closes 11 permanently in order to avoid overheating 11 by the arc. A signal must then be given at the same time to indicate unsuccessful re-connection of the converter so that the necessary steps can be taken. If rectifier 3 is also provided with a control device corresponding to 9, two connection attempts will be obtained per period.

When the bypass rectifiers 2 and 5 have become current-carrying and the breaker 11 has opened, the member 8 can be opened and the normal control device of the rectifier bridge connected, whereupon normal converter operation is obtained.

Figure 4:
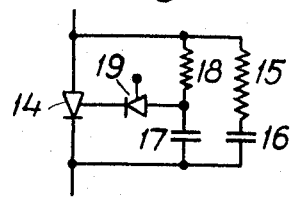
FIG. 4 shows purely symbolically a thyristor with its auxiliary circuits.

FIG. 4 shows purely schematically and symbolically one of the thyristors 14 in one of the rectifiers 1 – 6 with voltage dividing the firing circuits 15 – 19. Each thyristor in each rectifier is provided with similar circuits and is controlled by an auxiliary thyristor 19 which receives a control signal from the control device of the thyristor-rectifier in question, whether this is the normal control device, not shown, for normal operation, or one of the auxiliary control devices 7 or 9. The thyristor is connected in parallel with two voltage-divider circuits, one of which 15,16 is intended to distribute the voltage uniformly over the various thyristors both during conducting and blocking intervals and also during the firing and extinguishing process, whereas the other 17,18 is intended to charge up the power required for ignition of the thyristor 14 in the capacitor 17. As mentioned, these circuits are only shown purely symbolically, but it is clear that a certain amount of energy is required to charge these circuits before firing and, if the voltage from the arc voltage drop over the short-circuit element 11 is low, there is a risk of the thyristors not being ignited sufficiently quickly and reliably.

In the above description, converters with semiconductor-rectifiers and without a special bypass rectifier have been dealt with. In converters with mercury arc rectifiers it is generally necessary to have a bypass rectifier in order to unload the rectifier bridge in the event of a rectifier fault. However, this does not prevent the use of the invention with advantage even for converters having mercury arc rectifiers. In this case, the bypass rectifier will only be utilized for disconnection of the converter, while connection of the converter will take place in accordance with the principle of the invention described above, that is, two series-connected rectifiers are utilized as bypass rectifiers and take over the current from the bypass connection member. The advantage is thus gained that a high-speed breaker can be used as the bypass connection member and that the bypass rectifier need only be used for disconnection of the converter and can therefore be designed more simply.

What is claimed is:

1. Current converter comprising a three-phase rectifier bridge (1–6) having a plurality of rectifiers in each phase and a member (11) arranged in parallel with the bridge to bypass the DC side thereof, means for transferring current from said by-pass member (11) to two series-connected rectifiers (2,5) in one phase of the bridge so that they may act as by-pass rectifiers for the current converter, said means comprising a control circuit (7) for said series-connected rectifiers (2,5) to ignite such rectifiers and means to facilitate ignition of the two bypass rectifiers when the bypass member is opened in connection with a reconnection of the converter, comprising a firing device for at least one additional rectifier (6) of the bridge to ignite such additional rectifier, said firing device having such a delay angle that the internal direct voltage of the rectifier bridge will be positive seen in the conducting direction of the rectifiers, said current transferring means operating before deblocking of the current converter to connect said control circuit (7) to said two series-connected rectifiers (2,5), then to actuate said firing device (9) to ignite said rectifier (6) thereby causing current to flow through said bypass member in a direction opposite to the current therein to reduce the current substantially to zero, and then to open said bypass member (11).

2. Current converter according to claim 1, in which said firing device includes means to vary said delay angle in dependence on the magnitude of the current in said bypass member (11) prior to reconnection of the converter.

3. Current converter according to claim 1, in which said firing device is connected to several rectifiers (6,3) of the bridge for repeated attempts to fire the bypass rectifiers (2,5) during each period.

4. Current converter according to claim 1, in which said additional rectifier (6) is immediately ahead of to the bypass rectifier (2) in commutation sequence in the same commutation group (2,4,6).

5. Current converter according to claim 1, comprising a current sensitive means for sensing the current in the bypass member (11) after it has opened and for closing the bypass member if, after a certain time, it has not become currentless.

6. Current converter according to claim 1, in which said bypass member (11) comprises a breaker.

7. Current converter according to claim 6, having a current sensitive member (13) in series with said breaker (11) to open said breaker when the current reaches a predetermined low value.

* * * * *